(12) United States Patent
Yu et al.

(10) Patent No.: US 8,687,675 B2
(45) Date of Patent: Apr. 1, 2014

(54) METHOD AND SYSTEM FOR TRANSMITTING/RECEIVING DATA IN COMMUNICATION SYSTEM

(75) Inventors: Tak-Ki Yu, Suwon-si (KR);
Myeon-Kyun Cho, Seongnam-si (KR);
Dong-Ho Kim, Seoul (KR); Jae-Yeun Yun, Bucheon-si (KR); Yong-Hoon Lee, Daejeon (KR); Sae-Young Chung, Daejeon (KR); Young-Seok Oh, Suncheon-si (KR)

(73) Assignees: Samsung Electronics Co., Ltd (KR);
Korea Advanced Institute of Science & Technology (KAIST) (KR)

( * ) Notice: Subject to any disclaimer, the term of this patent is extended or adjusted under 35 U.S.C. 154(b) by 1092 days.

(21) Appl. No.: 11/850,545

(22) Filed: Sep. 5, 2007

(65) Prior Publication Data
US 2008/0240268 A1    Oct. 2, 2008

(30) Foreign Application Priority Data

Mar. 26, 2007   (KR) .................. 10-2007-0029213

(51) Int. Cl.
*H04B 13/02*    (2006.01)
*H04B 1/38*    (2006.01)

(52) U.S. Cl.
USPC ................................. 375/219; 455/73; 710/1

(58) Field of Classification Search
USPC .................. 375/219, 246, 348, 260, 267
See application file for complete search history.

(56) References Cited

U.S. PATENT DOCUMENTS

| 6,047,020 A * | 4/2000 | Hottinen .................... 375/130 |
| 6,834,043 B1 * | 12/2004 | Vook et al. .................. 370/310 |
| 7,242,720 B2 | 7/2007 | Sugiyama et al. |
| 2001/0031017 A1 * | 10/2001 | Betts .......................... 375/265 |
| 2002/0150154 A1 * | 10/2002 | Warke ......................... 375/222 |
| 2003/0189999 A1 * | 10/2003 | Kadous ....................... 375/349 |
| 2004/0091056 A1 * | 5/2004 | Harikumar et al. ........... 375/260 |
| 2004/0194007 A1 * | 9/2004 | Hocevar ....................... 714/801 |
| 2004/0236450 A1 * | 11/2004 | Bryant et al. ................. 700/108 |

(Continued)

FOREIGN PATENT DOCUMENTS

| KR | 1020020079489 | 10/2002 |
| KR | 1020050066634 | 6/2005 |
| KR | 1020070005776 | 1/2007 |

OTHER PUBLICATIONS

Lee et al. "A Bandwidth Efficient Precode to Reduce Intercarrier Interference in OFDM"; IEEE 2004; pp. 944-946.*
Zhao et al. "Intercarrier Interference Self-Cancellation Scheme for OFDM Mobile Communication System"; IEEE Jul. 2001; pp. 1185-1191.*

(Continued)

*Primary Examiner* — Shuwang Liu
*Assistant Examiner* — Gina McKie
(74) *Attorney, Agent, or Firm* — The Farrell Law Firm, P.C.

(57) ABSTRACT

Disclosed is a data transmission/reception method and system for minimizing intercarrier interference (ICI) in a communication system using a multicarrier. The data transmission method by a transmitter includes grouping transmission signals in units of a predetermined number of transmission signals when the transmitter has received the transmission signals, multiplying each group of the transmission signals by a transmission coding matrix, and transmitting the transmission signals multiplied by the transmission coding matrix to a receiver.

28 Claims, 5 Drawing Sheets

(56) References Cited

U.S. PATENT DOCUMENTS

| | | |
|---|---|---|
| 2005/0078761 A1* | 4/2005 | Hottinen et al. .............. 375/267 |
| 2005/0147176 A1* | 7/2005 | Yun et al. ...................... 375/260 |
| 2006/0153062 A1* | 7/2006 | Tanabe et al. ................. 370/208 |
| 2006/0256839 A1* | 11/2006 | Tsai et al. ..................... 375/131 |
| 2007/0009058 A1 | 1/2007 | Lee et al. |
| 2007/0189404 A1* | 8/2007 | Baum et al. ................... 375/260 |
| 2007/0217525 A1* | 9/2007 | Vrcelj et al. .................. 375/260 |
| 2012/0058734 A1* | 3/2012 | Perthold .................... 455/67.13 |

OTHER PUBLICATIONS

Tellambura et al. "Intercarrier Interference Self-Cancellation Space-Frequency Codes for MIMO-OFDM"; IEEE Sep. 2005; pp. 17291738.*

Chung et al. "Capacity Maximizing ICI Canceling Windows for OFDM in Time-Varying Channels"; IEEE 2006; pp. 4660-4664.*

Jae Yeun Yun et al.; "Design of ICI Canceling Codes for OFDM Systems Based on Capacity Maximization"; pp. 169-172; IEEE Signal Processing Letters, vol. 14, No. 3, Mar. 2007.

* cited by examiner

METHOD AND SYSTEM FOR TRANSMITTING/RECEIVING DATA IN COMMUNICATION SYSTEM

PRIORITY

This application claims priority to application the Korean Intellectual Property Office on Mar. 26, 2007 and assigned Serial No. 2007-29213, the contents of which are incorporated herein by reference.

BACKGROUND OF THE INVENTION

1. Field of the Invention

The present invention relates to a communication system, and more particularly to a method and system for transmitting/receiving data which can minimize InterCarrier Interference (ICI) in a communication system using a multicarrier.

2. Description of the Related Art

In communications, the most essential issue is to efficiently and reliably transmit data over a channel. The next generation multimedia mobile communication system, which is currently being developed, requires a high-speed communication system capable of processing and transmitting various information, such as image and radio data, beyond the early voice-oriented service. Therefore, it is necessary to increase system efficiency by using a channel coding scheme appropriate for the system.

Unlike a wired channel environment, in a radio channel environment of a wireless communication system, errors inevitably occur because of various factors, such as multipath interference, shadowing, propagation attenuation, time-varying noise, interference, and fading, resulting in a loss of information. The loss of information causes serious distortion of the transmission signals, thereby degrading the entire performance of the communication system. To reduce the loss of information, various error control techniques are used to increase the reliability of the system according to channel characteristics in which a basic technique is to use an error-correcting code.

In the next generation communication systems, research is actively being conducted to provide users with high-speed services having various Qualities of Services (QoS). As a next-generation communication system, a system (hereinafter, referred to as an OFDM/OFDMA communication system) employing an Orthogonal Frequency Division Multiplexing (OFDM) scheme and an Orthogonal Frequency Division Multiple Access (OFDMA) scheme has been proposed.

In order to remove ICI occurring in the OFDM/OFDMA communication system, various schemes, e.g. a scheme using frequency or time domain equalization, an ICI removal scheme using a code rate, and a frequency-domain partial response encoding scheme, have been proposed. The scheme using frequency or time domain equalization is the most general scheme which removes ICI by using a Minimum Mean Square Error (MMSE), Zero-Forcing (ZF), and a Decision Feedback Equalizer (DFE), in which a receiver estimates ICI and then performs an equalization operation based on the estimated ICI. Therefore, the scheme using frequency or time domain equalization has an advantage in that it is possible to efficiently remove ICI when the degree of change in a channel is small, but has a disadvantage in that the construction of a receiver for equalization can be complicated when the degree of change in a channel is large.

The ICI removal scheme using a code rate, e.g. the ICI removal scheme using a code rate of 1/k (k≥2), is performed in such a manner that one data symbol is multiplied by predefined weighting coefficients and is mapped to one group of subcarriers in the frequency domain, or that windowing is performed in the time domain by using only one subcarrier among one group of subcarriers. Therefore, according to the ICI removal scheme using a code rate, a receiver can identify a reception signal in which ICI has been cancelled through signal processing. Also, according to the ICI removal scheme using a code rate, a receiver can cancel more ICI in such a manner as to combine a plurality of subcarrier reception signals contained in one group in the frequency domain by means of the same weighting coefficients as a transmitter, or to use only one reception signal among subcarrier reception signals contained in one group after performing windowing in the time domain. The ICI removal scheme using a code rate has advantages in that it can easily and efficiently reduce ICI, and that a receiver has a more simple construction than that for the scheme using frequency or time domain equalization, but has a disadvantage in that a spectral efficiency corresponding to a code rate is reduced by 1/k times.

In addition, according to the frequency-domain partial response encoding scheme, Partial Response Coding (PRC) used for suppressing intersymbol interference in a single subcarrier system is performed in order to remove the ICI of transmission signals input to an Inverse Fast Fourier Transform (IFFT) module of a receiver. Therefore, according to the frequency-domain partial response encoding scheme, a carrier-to-interference ratio (CIR) after encoding becomes greater than that before encoding, so that ICI is efficiently removed. Although the frequency-domain partial response encoding scheme does not reduce the efficiency in the frequency band, the frequency-domain partial response encoding scheme has problems in that the effect is small in removing ICI, and that the construction of a receiver for signal detection is complicated because the receiver employs a Maximum-Likelihood Sequence Estimator (MLSE).

Therefore, it is necessary to develop a method for solving the above problems, that is, a data transmission/reception method for reducing the complexity of a receiver, improving the performance of the system, and minimizing ICI.

SUMMARY OF THE INVENTION

Accordingly, the present invention has been made to solve at least the above-mentioned problems occurring in the prior art, and the present invention provides a method and system for transmitting/receiving data in a communication system.

In addition, the present invention provides a data transmission/reception method and system for minimizing ICI in a communication system.

In accordance with an aspect of the present invention, there is provided a method for transmitting data by a transmitter in a communication system. The method includes grouping transmission signals in units of a predetermined number of transmission signals when the transmitter has received the transmission signals, multiplying each group of the transmission signals by a transmission coding matrix, and transmitting the transmission signals to a receiver multiplied by the transmission coding matrix.

In accordance with another aspect of the present invention, there is provided a method for receiving data by a receiver in a communication system. The method includes grouping reception signals in units of a predetermined number of reception signals when the receiver has received the reception signals from a transmitter, multiplying each group of the reception signals by a reception coding matrix, and outputting the reception signals multiplied by the reception coding matrix.

In accordance with still another aspect of the present invention, there is provided a system for transmitting/receiving data in a communication system. The system includes a transmitter for grouping a plurality of transmission signals in units of a predetermined number of transmission signals when the transmitter has received the transmission signals, multiplying each group of the transmission signals by a transmission coding matrix, and transmitting to a receiver the transmission signals multiplied by the transmission coding matrix; and a receiver for grouping reception signals in units of a predetermined number of reception signals when the receiver has received the reception signals from a transmitter, multiplying each group of the reception signals by a reception coding matrix, and outputting the reception signals multiplied by the reception coding matrix.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, an exemplary embodiment of the present invention will be described with reference to the accompanying drawings. In the following description, a detailed description of known functions and configurations incorporated herein will be omitted when it may obscure the subject matter of the present invention.

The present invention provides a method and system for transmitting/receiving data in a communication system, i.e., in an Institute of Electrical and Electronics Engineers (IEEE) 802.16 communication system, which is a Broadband Wireless Access (BWA) communication system. For convenience of description, the following description of the embodiments of the present invention are based on an IEEE 802.16 communication system employing an Orthogonal Frequency Division Multiplexing (OFDM)/Orthogonal Frequency Division Multiple Access (OFDMA) scheme (hereinafter referred to as an OFDM/OFDMA communication system). However, the method and system for transmitting/receiving data in a communication system according to the present invention can be applied to other communication systems.

In addition, the present invention provides a method and a system for transmitting/receiving data between a transmitter, e.g., a base station (BS) controlling a cell, and a receiver, e.g., a mobile station (MS) existing in the cell and receiving communication service from the transmitter. Also, the present invention provides a data transmission/reception method and system for minimizing InterCarrier Interference (ICI) occurring to data transmission/reception between a transmitter and a receiver in the OFDM/OFDMA communication system.

In addition, the present invention provides a data transmission/reception method and system for minimizing ICI by using a code rate in the communication system. Also, the present invention provides a data transmission/reception method and system for minimizing ICI by using a frequency-domain ICI canceling code of a certain code rate, e.g., code rate t/k (t≤k). The ICI canceling code according to an exemplary embodiment of the present invention improves the efficiency in the frequency band of the communication system, reduces the complexity of the receiver, and improves the capability and the channel capacity of the system, and the Bit-Error-Rate (BER) performance. Also, according to the present invention, in order to minimize ICI through a frequency-domain ICI canceling code of code rate of t/k in a t×t Multi-Input Multi-Output (MIMO) communication system or in a Single-input Single-Output (SISO) communication system, a transmitter transmits data by means of a transmission coding matrix, and a receiver receives data from the transmitter by means of a reception coding matrix.

The communication system according to the present invention determines an optimal transmission coding matrix and an optimal reception coding matrix. The transmitter in the communication system groups transmission signals in units of a predetermined number of transmission signals (e.g., in units of t number of transmission signals), multiplies each group by the transmission coding matrix, performs an Inverse Discrete Fourier Transform (IDFT) on signals obtained through the multiplication, and transmits the inverse-discrete-Fourier-transformed signals; and the receiver in the communication system performs a discrete Fourier transform (DFT) on signals received from the transmitter, groups the discrete-Fourier-transformed signals in units of a predetermined number of discrete-Fourier-transformed signals (e.g., in units of k number of discrete-Fourier-transformed signals), and multiplies each group by the reception coding matrix, thereby outputting t number of reception signals according to each reception coding matrix. The receiver detects transmission signals by means of a detector, such as a maximum-likelihood (ML) or Vertical Bell Labs Layered Space-Time (V-BLAST). Also, the frequency-domain ICI canceling code of code rate t/k, that is, the transmission coding matrix and reception coding matrix, are determined in such a manner as to calculate a channel capacity lower bound in a t×t MIMO communication system in which interference occurs, and then to determine matrices for the purpose of maximizing the calculated channel capacity lower bound, as the transmission coding matrix and reception coding matrix.

Figure 1:
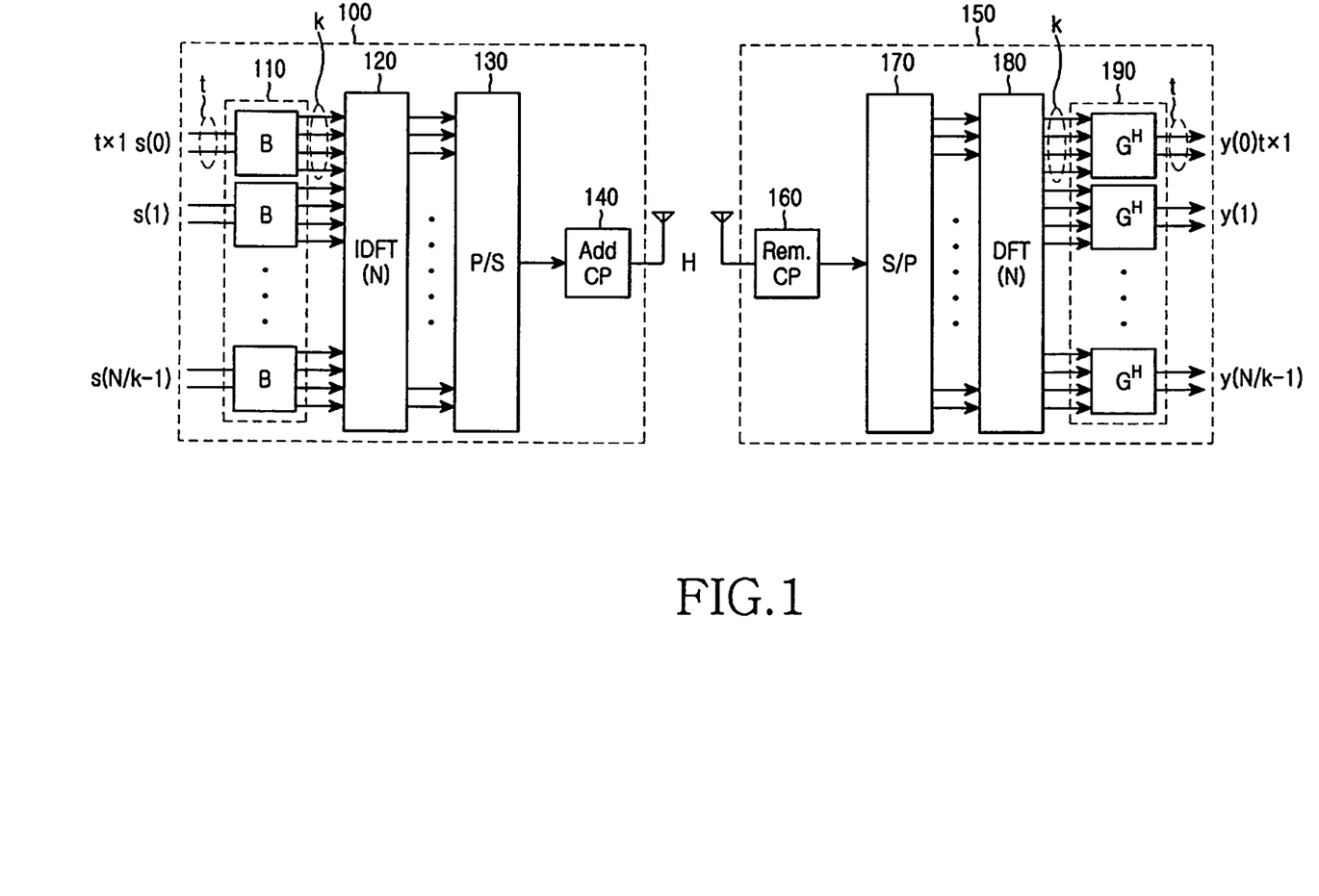
FIG. 1 is a block diagram illustrating the configurations of a transmitter and a receiver in the communication system according to an exemplary embodiment of the present invention.

FIG. 1 is a block diagram illustrating the configurations of a transmitter and a receiver in the communication system according to an exemplary embodiment of the present invention.

The transmitter 100 includes a first multiplication unit 110, an IDFT unit 120, a Parallel/Serial (P/S) conversion unit 130, and a cyclic prefix (CP) insertion unit 140. The first multiplication unit 110 groups signals to be transmitted, i.e., signals s input to the transmitter 100, in units of t number of signals, and multiplies each group by a transmission coding matrix B, thereby outputting k number of signals according to each transmission coding matrix B. The IDFT unit 120 performs an IDFT on output signals of the first multiplication unit 110.

The parallel/serial conversion unit 130 converts parallel signals, which have been subjected to the IDFT, into a serial signal. The CP insertion unit 140 inserts a CP into the serial signal before transmitting the serial signal through a transmission antenna. The receiver 150 includes a CP removal unit 160, a Serial/Parallel (S/P) conversion unit 170, a DFT unit 180, and a second multiplication unit 190. The CP removal unit 160 removes a CP from a signal received through a reception antenna from the transmitter 100. The serial/parallel conversion unit 170 converts a serial signal, which has been received from the CP removal unit 160, into a parallel signal. The DFT unit 180 performs a DFT on a signal received from the serial/parallel conversion unit 170. The second multiplication unit 190 groups signals, which have been received from the DFT unit 180, in units of k number of signals, multiplies each group by the reception coding matrix $G^H$, and outputs t number of reception signals y according to the reception coding matrix $G^H$.

When N number of subcarriers for symbols exist in the transmitter 100 and receiver 150, that is, when the size of the IDFT 120 is N, the first multiplication unit 110 of the transmitter 100 includes N/k number of first multipliers. In this case, signals to be transmitted, that is, input signals (s) are input to the first multipliers in such a manner that t number of input signals are input to each first multiplier, and the t number of input signals (s) input to each first multiplier are multiplied by the transmission coding matrix B, so that k number of output signals are output from each first multiplier to the IDFT unit 120. That is, each of the first multipliers receives t number of input symbols, and outputs subcarriers, obtained by multiplying the t number of input symbols by the transmission coding matrix, to the IDFT unit 120. In addition, when N number of subcarriers exist in channel H formed between the transmitter 100 and receiver 150, as described above, that is, when the size of the DFT 180 is N, the second multiplication unit 190 of the receiver 150 includes N/t number of second multiplier. In this case, output signals of the DFT 180 are input to the second multipliers in such a manner that k number of output signals are input to each second multiplier, and the k number of output signals input to each second multiplier are multiplied by the reception coding matrix $G^H$, so that t number of output signals are output from each second multiplier. That is, each of the second multipliers receives k number of subcarriers, and multiplies the k number of subcarriers by the reception coding matrix $G^H$, thereby outputting t number of output symbols. In this case, the transmission coding matrix B corresponds to a k×t matrix, and the reception coding matrix $G^H$ corresponds to a t×k matrix. A procedure of determining an optimal transmission coding matrix "B" of k×t and an optimal reception coding matrix $G^H$ of t×k in the communication system according to an exemplary embodiment of the present invention will now be described in detail.

First, a reception signal y received to the receiver 150 may be expressed as Equation (1) below.

$$y=\Phi^H \Theta s + \Phi^H w \quad (1)$$

In Equation (1), y represents a reception signal received to the receiver 150, $\Phi^H$ represents an M×N matrix, the diagonal block of which corresponds to the reception coding matrix $G^H$ of t×k, "H" represents a matrix of channel H formed between the transmitter 100 and the receiver 150, s represents a signal, i.e., an input signal (s), to be transmitted by the transmitter 100, $\Theta$ represents an N×M matrix, the diagonal block of which corresponds to the transmission coding matrix B of k×t, and w represents an N-dimensional Additive White Gaussian Noise (AWGN) vector. The M represents the number of transmission subcarriers, in which it can be understood that M number of subcarriers exist for the input signal (s).

Then, the DFT matrix of the DFT unit 180 in the receiver 150 is defined as Q, $H_t$ which is an N×N matrix, corresponds to a time-domain channel matrix between the transmitter 100 and the receiver 150, and H corresponds to a frequency-domain channel matrix defined by $H=QH_tQ^H$. In this case, $[H_t]_{p,q}$ is defined as $[H_t]_{p,q}=h(p;(p-q)_N)$ if "$0 \le (p-q)_N \le L-1$, and as 0 otherwise, in which $(\ )_N$ represents a modulo operation, h(n;l) represents a $l^{th}$ tap of a time-domain channel impulse response corresponding to an $n^{th}$ sample of a symbol, and L represents the number of time-domain channel impulse response taps.

In this case, when a channel within one symbol changes in the communication system, ICI occurs, and such ICI appears as non-diagonal elements of the channel matrix H. Therefore, when the channel matrix H is divided into a plurality of k×k blocks in order to divide the communication system into a plurality of sub-systems, an $(u,v)^{th}$ block of the channel matrix "H" may be expressed as H(u,v). Using the H(u,v), the y, s, and w in Equation 1 are separately expressed as $y=[y^T(0), \ldots, y^T(M/t-1)]^T$, $s=[s^T(0), \ldots, s^T(M/t-1)]^T$, and $w=[w^T(0), \ldots, w^T(N/k-1)]^T$. Herein, y(u) and s(u) correspond to $t^{th}$-order vectors, and w(u) corresponds to a $k^{th}$-order vector. Therefore, Equation (1) may be expressed as Equation (2) below by using the H(u,v).

$$y(u) = G^H H(u,u) Bs(u) + \sum_{v=0, v \ne u}^{N/k-1} G^H H(u,v) Bs(v) + G^H w(u) \quad (2)$$
$$= G^H H(u,u) Bs(u) + v(u)$$

In Equation (2), "v(u)" may be expressed as Equation (3) below.

$$v(u) = \sum_{v=0, v \ne u}^{N/k-1} G^H H(u,v) Bs(v) + G^H w(u) \quad (3)$$

In Equation (2), $G^H H(u,u) Bs(u)$ represents a signal which the receiver 150 desires to receive from the transmitter 100, and $$\sum_{v=0, v \ne u}^{N/k-1} G^H H(u,v) Bs(v) + G^H w(u)$$

i.e., v(u), represents interference and noise. In this case, as described above, the optimal transmission coding matrix B and optimal reception coding matrix $G^H$ to maximize the capacity of the t×t MIMO communication system, in which interference exists, are determined taking into consideration the maximum transmission power. The code rate according to an exemplary embodiment of the present invention is determined by the dimensions of the transmission coding matrix B and reception coding matrix $G^H$, in which the receiver 150 estimates a channel, and than detects s(u) by means of a detector corresponding to the t×t MIMO communication system.

The following description will be given about a procedure of calculating the channel capacity (i.e., a channel capacity lower bound, as described above) of the t×t MIMO communication system, and determining the optimal transmission coding matrix B and optimal reception coding matrix $G^H$ to maximize the calculated channel capacity lower bound.

First, in order to calculate a channel capacity lower bound of the system by Equation (2), the following is assumed.

It is assumed that a signal (i.e., an input signal S) to be transmitted by the transmitter 100 and a noise W correspond to circularly symmetric Gaussian random vectors with covariance of $R_S = I^M$ and $R_W = \sigma^2 I_N$, respectively, all multiple paths of a time-domain channel are mutually uncorrelated, and the taps of each time-domain channel satisfy Equation (4) below in a Wide-Sense Stationary (WSS) random process which have magnitudes with Rayleigh distribution and have phases with uniform distribution $$E[h(n;l)h^*(n';l')] = \sigma_l^2 r(n-n')\delta(l-l') \tag{4}$$

In Equation (4), $\sigma_l^2$ represents an average power of a $l^{th}$ channel tap, $r(n) = E[h(m+n;l)h^*(m;l)]/\sigma_l^2$, and the power of the channel is normalized to 1, i.e., $\Sigma_l \sigma_l^2 = 1$. Therefore, $v(u)$ is independent of $s(u)$, and a signal-to-noise ratio (SNR) becomes $1/\sigma^2$. In this case, since the $v(u)$ corresponds to a linear combination of two Gaussian probability process multiplications, the $v(u)$ does not have a Gaussian distribution. Therefore, instead of calculating an exact channel capacity on the assumption that the $v(u)$ has a Gaussian distribution, a channel capacity lower bound is calculated. The channel capacity lower bound may be expressed as Equation (5) below.

$$C_u = E\left[\frac{1}{k}\log_2 \det(I_t + G^H H(u,u)BB^H H^H(u,u)GR_{v(u)}^{-1})\right] \tag{5}$$

In Equation 5, Cu represents the channel capacity of a $u^{th}$ sub-system, and covariance $R_{v(u)}$ of the $v(u)$ must be expressed by a transmission coding matrix B and a reception coding matrix "$G^H$" in order to determine the optimal transmission coding matrix B and optimal reception coding matrix $G^H$, in which the $R_{v(u)}$ may be expressed as Equation (6) below.

$$R_{v(u)} = G^H \tilde{Q}\left\{\left(\frac{N}{k}R'_T - R_T\right) \otimes (R_F \cdot BB^H)\right\}\tilde{Q}^H G + \sigma^2 G^H G \tag{6}$$

In Equation (6), ⊕ represents a Kronecker product operation, ○ represents a Hadamard product operation, and the $(p,q)^{th}$ $R_F$, $R_T$, $R'_T$, and Q may be expressed as Equations (7) to (10), respectively.

$$[R_F]_{p,q} = \sum_{l=0}^{L-1} \sigma_l^2 e^{-j\frac{2\pi}{N}(p-q)l} \tag{7}$$

$$[R_T]_{p,q} = r(p-q) \tag{8}$$

$$[R'_T]_{p,q} = [R_T]_{p,q} \cdot \delta\left(p - q + m\frac{N}{k}\right) \tag{9}$$

$$\tilde{Q} = [\tilde{q}_0 \tilde{q}_0^H, \ldots, \tilde{q}_{N-1}\tilde{q}_{N-1}^H] \tag{10}$$

The m in Equation (9) represents a random integer, and the $\tilde{q}_n$ in Equation (10) represents a $k^{th}$-order vector, which is $$(1/\sqrt{N})e^{-j\frac{2\pi}{N}np}.$$

After the channel capacity lower bound is calculated by using the Monte Carlo Method, the optimal transmission coding matrix B and optimal reception coding matrix $G^H$ to maximize the calculated channel capacity lower bound are determined. In this case, since the channel capacity lower bounds of all sub-systems are the same, the channel capacity lower bound of the system may be expressed as $C_0$, regardless of sub-systems.

Then, the transmission coding matrix B and reception coding matrix $G^H$ are determined as optimal matrices to maximize the channel capacity lower bound $C_0$, as described above. The maximization of the channel capacity lower bound $C_0$ may be expressed as Equation (11) below.

$$\max_{B,G} C_0, \text{ subject to trace } [BB^H] = k \tag{11}$$

In this case, the transmission coding matrix B and reception coding matrix $G^H$ determines optimal matrices to maximize the channel capacity lower bound for a time-varying Rayleigh channel, and defines and determines mutually different autocorrelations r(n) with respect to channels other than the time-varying Rayleigh channel.

For example, it is assumed that when a Doppler frequency $f_d T_s$ changes from 0.01 to 0.51 in units of 0.05, channel H(0,0) is independently generated by using the Jakes model, and the autocorrelation r(n) corresponds to an average of $J_0(2\pi f_d T_s n/N)$ when the $f_d T_s$ changes from 0.01 to 0.51. Herein, Ts represents an OFDM symbol time, and $J_0$ represents the $0^{th}$ Bessel function of a first kind. Then, the channel matrix H in Equation 5 may be approximately obtained by taking an average of the generated channel H(0,0), the optimal transmission coding matrix B and optimal reception coding matrix $G^H$ are determined through the approximation, and ICI canceling codes, that is, the optimal transmission coding matrix B and optimal reception coding matrix $G^H$ have real numbers and a condition of B=G. The optimal transmission coding matrix B determined by satisfying the above conditions may be expressed as Table 1 below.

TABLE 1

|  | k = t | k = t + 1 |
|---|---|---|
| t = 1 | x | $B = \begin{bmatrix} 0.5806 \\ -1.2895 \end{bmatrix}$ |
| t = 2 | $B = \begin{bmatrix} 0.9924 & 0.1193 \\ -0.8183 & 0.5756 \end{bmatrix}$ | $B = \begin{bmatrix} 0.3775 & -0.3992 \\ -1.1724 & 0.1653 \\ 0.5356 & 1.0047 \end{bmatrix}$ |

TABLE 1-continued

| | k = t | k = t + 1 |
|---|---|---|
| t = 3 | $B = \begin{bmatrix} 0.4860 & -0.3793 & 0.4933 \\ 0.3906 & 0.8296 & -0.9550 \\ -0.5251 & 0.1761 & 0.5630 \end{bmatrix}$ | $B = \begin{bmatrix} 0.1675 & 0.4929 & 0.0191 \\ -0.8985 & -0.5371 & 0.4222 \\ 0.9253 & -0.6611 & 0.1376 \\ -0.1870 & -0.0674 & -1.0502 \end{bmatrix}$ |
| t = 4 | $B = \begin{bmatrix} 0.0587 & -0.3621 & 0.1860 & 0.6058 \\ -0.7321 & 0.9488 & 0.1101 & -0.1206 \\ 0.3531 & -0.3797 & 0.7439 & -0.8012 \\ -0.2657 & -0.3300 & -0.5968 & 0.0344 \end{bmatrix}$ | $B = \begin{bmatrix} -0.3750 & 0.1145 & 0.0709 & -0.3080 \\ 0.7505 & -0.5189 & 0.5638 & 0.2114 \\ -0.3970 & -0.4366 & -0.6759 & 0.6591 \\ 0.5901 & 0.4290 & -0.6773 & -0.5146 \\ -0.0448 & 0.7957 & 0.3073 & 0.5713 \end{bmatrix}$ |

Hereinafter, the channel capacity lower bound and BER performance of a communication system according to an exemplary embodiment of the present invention will be described.

Figure 2:
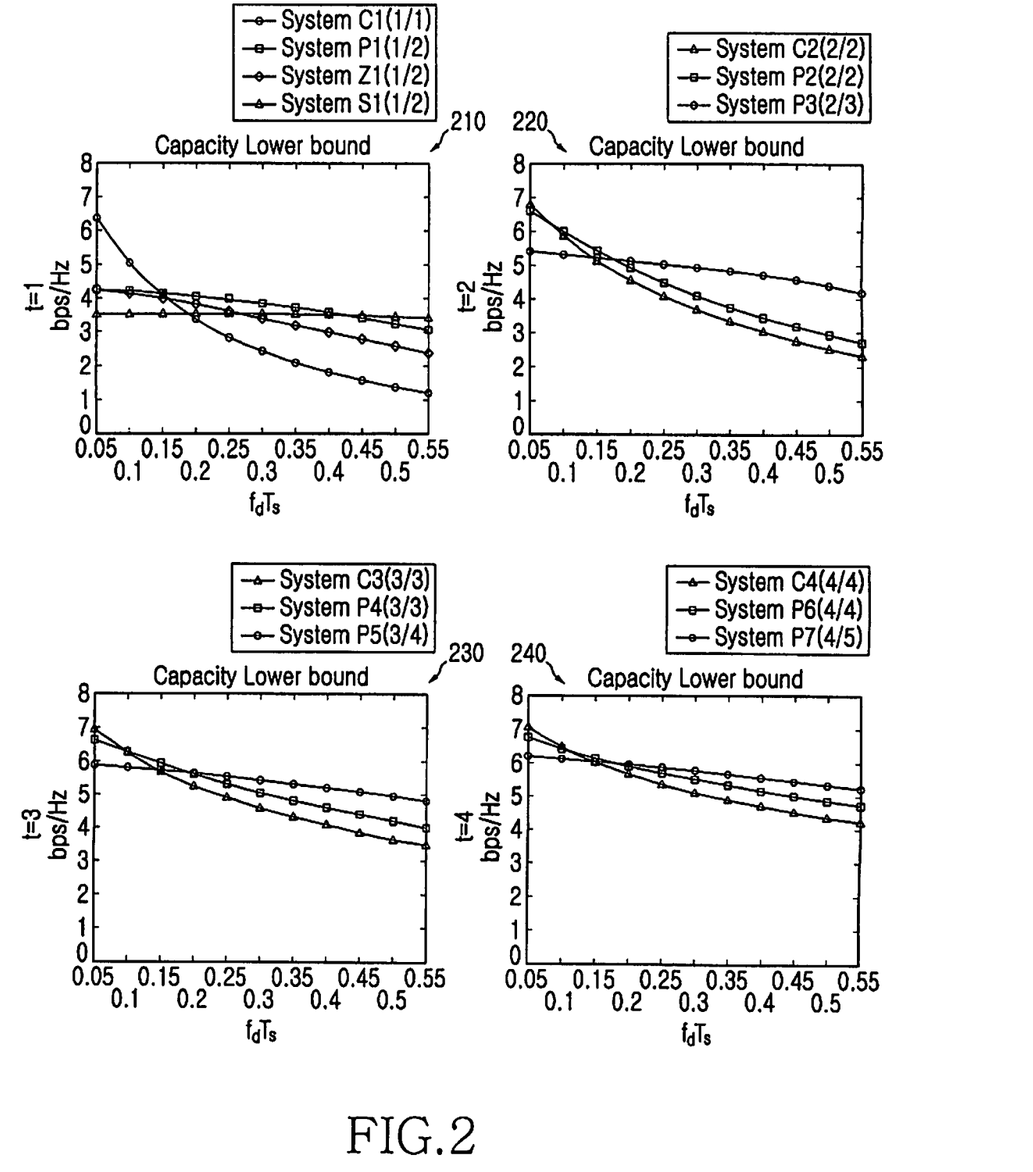
FIG. 2 is a diagram illustrating channel capacity lower bounds in a communication system according to an exemplary embodiment of the present invention.

FIG. 2 is a diagram illustrating channel capacity lower bounds in a communication system according to an exemplary embodiment of the present invention. That is, FIG. 2 shows channel capacity lower bounds in a frequency selective channel when an SNR is 25 dB.

When t=1 (see reference numeral 210), among the systems, for example, among system #1 C1, to which a 1/1 code and an ICI canceling code are not applied (i.e., to which B=G=1 is applied), system #2 P1, to which a 1/2 code according to the present invention is applied, system #3 Z1, to which a 1/2 code and $B=G=[1, -1]^T$ are applied, and system #4 S1, to which a 1/2 code and $B=G=[0, \sqrt{2}]$ are applied, the channel capacity lower bound of system #2 P1, to which the 1/2 code according to the present invention is greater than that of any other system, so that system #2 P1 has best performance.

Particularly, when t=2 (see reference numeral 220), among systems, for example, among system #5 C2, to which a 2/2 code and an ICI canceling code are not applied (i.e., to which $B=G=I_2$ is applied), system #6 P2, to which a 2/2 code according to the present invention is applied, and system #7 P3, to which a 2/3 code according to the present invention is applied, the channel capacity lower bounds of system #6 P2 and system #7 P3 are greater than that of system #5 C2, to which a 2/2 code and an ICI canceling code are not applied.

Also, when t=3 (see reference numeral 230) and t4 (see reference numeral 240), for example, the channel capacity lower bounds of system #8 C3, to which a 3/3 code and an ICI canceling code are not applied, and system #11 C4, to which a 4/4 code and an ICI canceling code are not applied, are less than those of system #9 P4, system #10 P5, system #12 P6, and system #13 P7, to which a 3/3 code, a 3/4 code, a 4/4 code, and 4/5 code, respectively, according to the present invention, are applied. Accordingly, systems, to which an ICI code according the present invention is applied are robust to ICI.

Figure 3:
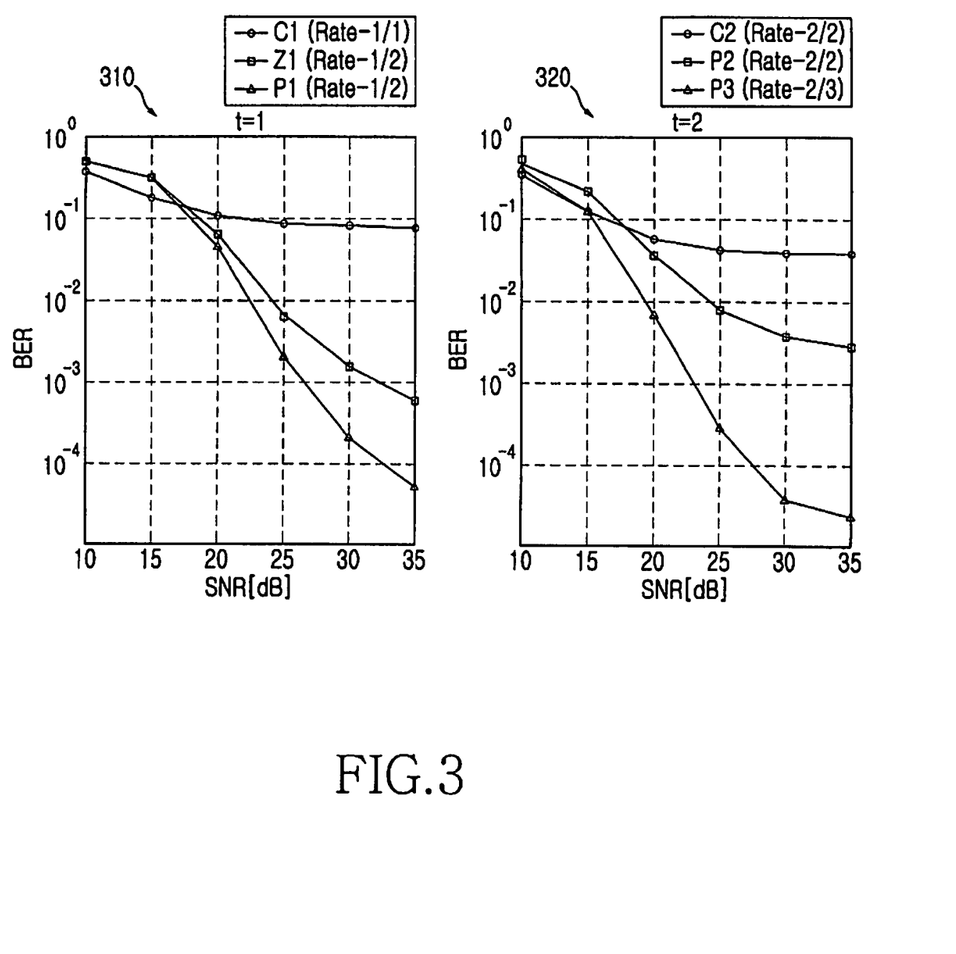
FIG. 3 is a diagram illustrating BERs when channel encoding is performed in the communication system according to an exemplary embodiment of the present invention.

FIG. 3 is a diagram illustrating BERs when channel encoding is performed in the communication system according to an exemplary embodiment of the present invention. That is, FIG. 3 shows BERs when channel encoding is performed in a frequency selective fading channel with Doppler frequency $f_d T_s$ of 0.2.

Among the systems, when t=1 (see reference numeral 310), for example, system #1 C1, to which a 1/1 code and an ICI canceling code are not applied (i.e., to which B=G=1 is applied), system #2 P1, to which a 1/2 code according to the present invention is applied, and system #3 Z1, to which a 1/2 code and $B=G=[1, -1]^T$ are applied; and when t=2 (see reference numeral 320), for example, system #5 C2, to which a 2/2 code and an ICI canceling code are not applied (i.e., to which $B=G=I_2$ is applied), system #6 P2, to which a 2/2 code according to the present invention is applied, and system #7 P3, to which a 2/3 code according to the present invention is applied, the performance degradations by ICI in the systems (i.e., system #2 P1, system #6 P2, system #7 P3), to which an ICI code according to an exemplary embodiment of the present invention is applied, are less than those in the systems, to which the ICI code is not applied.

Figure 4:
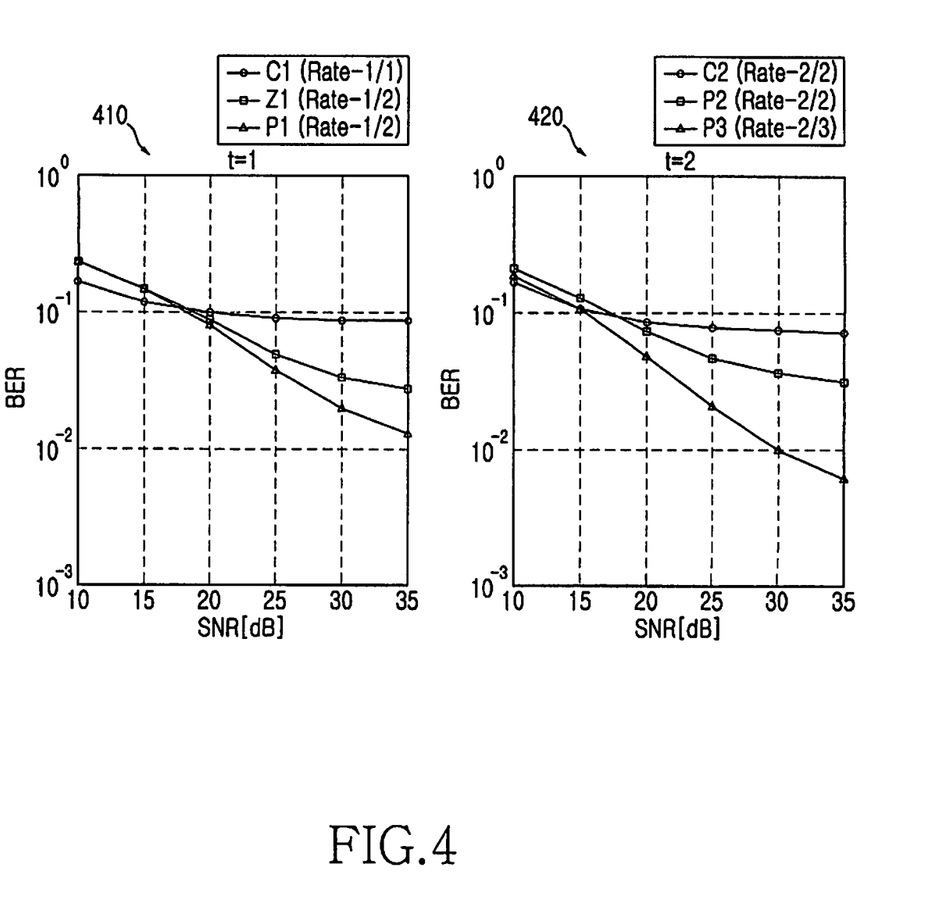
FIG. 4 is a diagram illustrating BERs when channel encoding is not performed in the communication system according to an exemplary embodiment of the present invention.

FIG. 4 is a diagram illustrating BERs when channel encoding is not performed in the communication system according to an exemplary embodiment of the present invention. That is, FIG. 4 shows BERs when channel encoding is not performed in a frequency selective fading channel with Doppler frequency "$f_d T_s$" of 0.2.

Among the systems, when t=1 (see reference numeral 410), for example, system #1 C1, to which a 1/1 code and an ICI canceling code are not applied (i.e., to which B=G=1 is applied), system #2 P1, to which a 1/2 code according to the present invention is applied, and system #3 Z1, to which a 1/2 code and $B=G=[1, -1]^T$ are applied; and when t=2 (see reference numeral 420), for example, system #5 C2, to which a 2/2 code and an ICI canceling code are not applied (i.e., to which $B=G=I_2$ is applied), system #6 P2, to which a 2/2 code according to the present invention is applied, and system #7 P3, to which a 2/3 code according to the present invention is applied, the performance degradations by ICI in the systems (i.e., system #2 P1, system #6 P2, system #7 P3), to which an ICI code according to an exemplary embodiment of the present invention is applied, are less than those in the systems, to which the ICI code is not applied.

Figure 5:
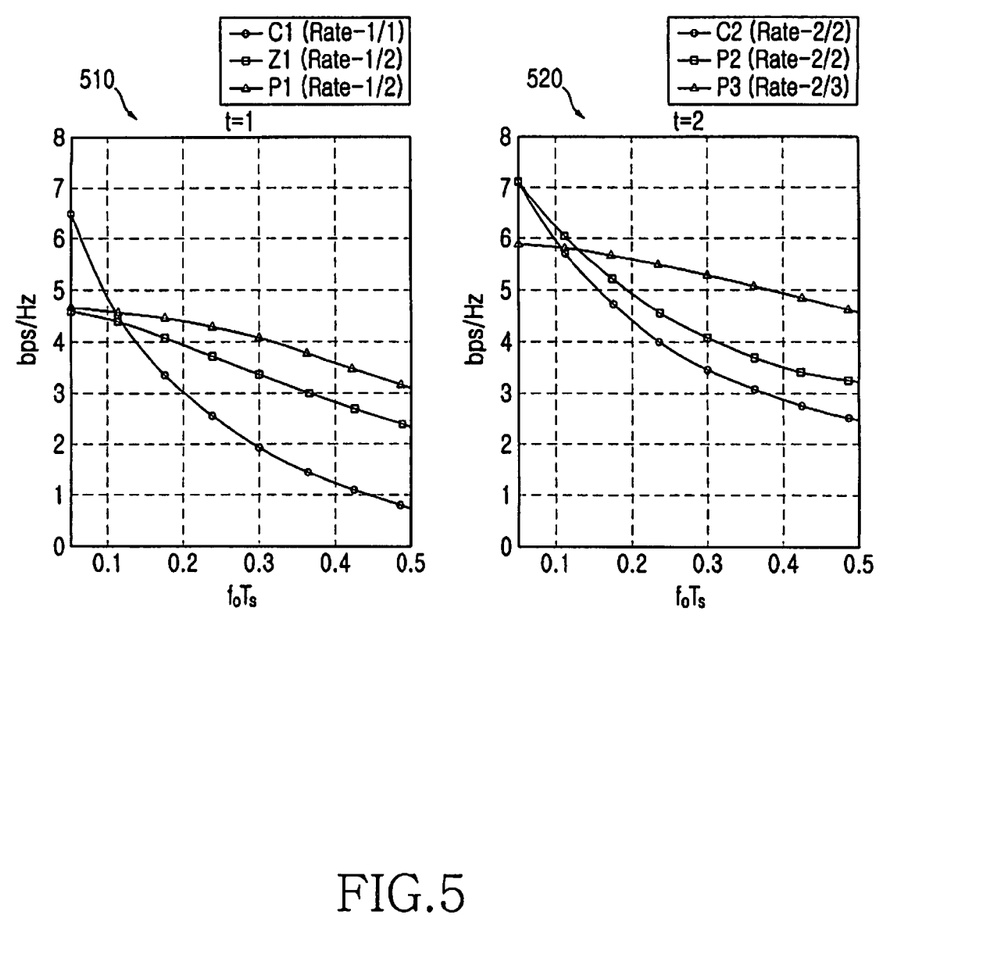
FIG. 5 is a diagram illustrating channel capacity lower bounds in the communication system according to an exemplary embodiment of the present invention.

FIG. 5 is a diagram illustrating channel capacity lower bounds in the communication system according to an exemplary embodiment of the present invention. That is, FIG. 5 shows channel capacity lower bounds in an AWGN channel with an SNR of 25 dB.

Among Single-Input Single-Output (SISO) systems, when t=1 (see reference numeral 510), for example, system #1 C1, to which a 1/1 code and an ICI canceling code are not applied (i.e., to which B=G=1 is applied), system #2 P1, to which a 1/2 code according to the present invention is applied, and system #3 Z1, to which a 1/2 code and $B=G=[1, -1]^T$ are applied; and when t=2 (see reference numeral 520), for example, system #5 C2, to which a 2/2 code and an ICI canceling code are not applied (i.e., to which $B=G=I_2$ is applied), system #6 P2, to which a 2/2 code is applied, and system #7 P3, to which a 2/3 code is applied, the channel capacity less bounds of the systems, to which the ICI canceling code is not applied, are lower than those of the system, to which the ICI canceling code is not applied. Therefore, it can be understood that the systems, to which an ICI code according to an exemplary embodiment of the present invention is applied, are robust to ICI.

As described above, according to the present invention, it is possible to minimize ICI by using a transmission coding matrix and a reception coding matrix upon transmitting/receiving data. By minimizing ICI, the present invention can improve a data transmission/reception efficiency and a system performance, and can reduce the complexity of the system.

While the present invention has been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for transmitting data by a transmitter in a communication system, the method comprising the steps of:
    grouping transmission signals in units of transmission signals according to a transmission coding matrix having a t/k size;
    multiplying each of the units of the transmission signals by the transmission coding matrix;
    Inverse Discrete Fourier Transform (IDFT) processing the units of the multiplied transmission signals at one time according to a size of IDFT; and
    transmitting to a receiver the IDFT processed units of the multiplied transmission signals;
    where t is a number of transmission signals included in each unit of the transmission signals, and k is a number of multiplied transmission signals included in each unit of the multiplied transmission signals;
    wherein, when a channel formed between the transmitter and the receiver is a time-varying Rayleigh channel, the transmission coding matrix is a matrix to maximize a channel capacity lower bound,
    wherein the channel capacity lower bound is determined based on interference information of the channel, noise information and a maximum transmission power of the transmitter, and
    wherein the interference information and the noise information are used to calculate a covariance of interference and noise to be received by the receiver.

2. The method as claimed in claim 1, wherein the covariance is used to determine the channel capacity lower bound if a transmission power of the transmitter is the maximum transmission power.

3. The method as claimed in claim 2, wherein the transmission coding matrix is determined based on the covariance.

4. The method as claimed in claim 1, wherein the transmission coding matrix includes a diagonal block of the matrix of the channel.

5. The method as claimed in claim 1, wherein the transmission coding matrix corresponds to a k×t matrix.

6. The method as claimed in claim 1, wherein the IDFT processed units of the multiplied transmission signals are transmitted to the receiver through transmission antennas.

7. A method for receiving data by a receiver in a communication system, the method comprising the steps of:
    receiving signals from a transmitter;
    Discrete Fourier Transform (DFT) processing the reception signals at one time according to a size of DFT;
    grouping the DFT processed reception signals in units of reception signals according to a reception coding matrix having a t/k size;
    multiplying each of the units of the reception signals by the reception coding matrix; and
    outputting each of the units of the multiplied reception signals;
    where k is a number of reception signals included in each unit of the reception signals, and t is a number of multiplied reception signals included in each unit of the multiplied reception signals;
    wherein, when a channel formed between the transmitter and the receiver is a time-varying Rayleigh channel, the reception coding matrix is a matrix to maximize a channel capacity lower bound,
    wherein the channel capacity lower bound is determined based on interference information of the channel, noise information and a maximum transmission power of the transmitter, and
    wherein the interference information and the noise information are used to calculate a covariance of a received interference and noise.

8. The method as claimed in claim 7, wherein the covariance is used to determine the channel capacity lower bound if a transmission power of the transmitter is the maximum transmission power.

9. The method as claimed in claim 8, wherein the reception coding matrix is determined based on the covariance.

10. The method as claimed in claim 7, wherein the reception coding matrix includes a diagonal block of a matrix of the channel.

11. The method as claimed in claim 7, wherein the reception coding matrix corresponds to a t×k matrix.

12. The method as claimed in claim 7, wherein receiving signals comprises receiving the signals from the transmitter through reception antennas.

13. A transmitter for transmitting data in a communication system, the transmitter comprising:
    a multiplication unit for grouping transmission signals in units of t number of transmission signals according to a transmission coding matrix having a t/k size, and multiplying each of the units of the transmission signals by the transmission coding matrix;
    an Inverse Discrete Fourier Transform (IDFT) unit for IDFT processing the units of the multiplied transmission signals at one time according to a size of IDFT; and
    a transmission unit for transmitting to a receiver the IDFT processed units of the multiplied transmission signals;
    wherein t is a number of transmission signals included in each unit of the transmission signals, and k is a number of multiplied transmission signals included in each unit of the multiplied transmission signals; and
    wherein, when a channel formed between the transmitter and the receiver is a time-varying Rayleigh channel, the transmission coding matrix is a matrix to maximize a channel capacity lower bound,
    wherein the channel capacity lower bound is determined based on interference information of the channel, noise information and a maximum transmission power of the transmitter, and
    wherein the interference information and the noise information are used to calculate a covariance of interference and noise to be received by the receiver.

14. The transmitter as claimed in claim 13, wherein the covariance is used to determine the channel capacity lower bound if a transmission power of the transmitter is the maximum transmission power.

15. The transmitter as claimed in claim 14, wherein the transmission coding matrix is determined based on the covariance.

16. The transmitter as claimed in claim 13, wherein the transmission coding matrix includes a diagonal block of a matrix of the channel.

17. The transmitter as claimed in claim 13, wherein the transmission coding matrix corresponds to a k×t matrix.

18. The transmitter as claimed in claim 13, wherein the transmission unit transmits the IDFT processed units of the multiplied transmission signals to the receiver through transmission antennas.

19. A receiver for receiving data in a communication system, the receiver comprising:
- a reception unit for receiving signals from a transmitter;
- a Discrete Fourier Transform (DFT) unit for processing reception signals at one time according to a size of DFT; and
- a multiplication unit for grouping the DFT processed reception signals in units of reception signals according to a reception coding matrix having a t/k size, multiplying each of the units of the reception signals by the reception coding matrix, and outputting each of the units of the multiplied reception signals, wherein k is a number of reception signals included in each unit of the reception signals, and t is a number of the multiplied reception signals included in each unit of the multiplied reception signals, wherein, when a channel formed between the transmitter and the receiver is a time-varying Rayleigh channel, the reception coding matrix is a matrix to maximize a channel capacity lower bound, wherein the channel capacity lower bound is determined based on interference information of the channel, noise information and a maximum transmission power of the transmitter, and wherein the interference information and the noise information are used to calculate a covariance of a received interference and noise.

20. The receiver as claimed in claim 19, wherein the covariance is used to determine the channel capacity lower bound if a transmission power of the transmitter is the maximum transmission power.

21. The receiver as claimed in claim 20, wherein the reception coding matrix is determined based on the covariance.

22. The receiver as claimed in claim 19, wherein the reception coding matrix includes a diagonal block of a matrix of the channel.

23. The receiver as claimed in claim 19, wherein the reception coding matrix corresponds to a t×k matrix.

24. The receiver as claimed in claim 19, wherein the reception unit receives the signals from the transmitter through reception antennas.

25. The method as claimed in claim 1, wherein the transmission coding matrix is determined using a first autocorrelation value, and the first autocorrelation value is different from a second autocorrelation value used in the time-varying Rayleigh channel, when the channel is a channel different from the time-varying Rayleigh channel.

26. The method as claimed in claim 7, wherein the reception coding matrix is determined using a first autocorrelation value, and the first autocorrelation value is different from a second autocorrelation value used in the time-varying Rayleigh channel, if the channel is a channel different from the time-varying Rayleigh channel.

27. The transmitter as claimed in claim 13, wherein the transmission coding matrix is determined using a first autocorrelation value, and the first autocorrelation value is different from a second autocorrelation value used in the time-varying Rayleigh channel, if the channel is a channel different from the time-varying Rayleigh channel.

28. The receiver as claimed in claim 19, wherein the reception coding matrix is determined using a first autocorrelation value, and the first autocorrelation value is different from a second autocorrelation value used in the time-varying Rayleigh channel, if the channel is a channel different from the time-varying Rayleigh channel.

* * * * *